(12) United States Patent
Levecq et al.

(10) Patent No.: US 7,495,753 B2
(45) Date of Patent: Feb. 24, 2009

(54) METHOD AND APPARATUS FOR CONTACTLESS MEASUREMENT OF THE RADIUS OF CURVATURE OF AN OPHTHALMIC ARTICLE

(75) Inventors: Xavier Levecq, Gif sur Yvette (FR); Sylvain Chene, Charenton-le-Pont (FR)

(73) Assignee: Essilor International (FR)

( * ) Notice: Subject to any disclaimer, the term of this patent is extended or adjusted under 35 U.S.C. 154(b) by 0 days.

(21) Appl. No.: 11/791,246

(22) PCT Filed: Dec. 8, 2005

(86) PCT No.: PCT/EP2005/056620

§ 371 (c)(1),
(2), (4) Date: Jul. 2, 2007

(87) PCT Pub. No.: WO2006/067050

PCT Pub. Date: Jun. 29, 2006

(65) Prior Publication Data

US 2007/0291259 A1  Dec. 20, 2007

(30) Foreign Application Priority Data

Dec. 20, 2004  (FR) .................................. 04 53086

(51) Int. Cl.
*G01B 9/00* (2006.01)
*G01J 1/00* (2006.01)
(52) U.S. Cl. ...................................... 356/124; 356/123
(58) Field of Classification Search ........................ None
See application file for complete search history.

(56) References Cited

U.S. PATENT DOCUMENTS 3,028,782 A * 4/1962 Bernhardt et al. ........... 356/513
5,825,476 A * 10/1998 Abitol et al. ................ 356/124
6,750,957 B1 * 6/2004 Levecq et al. ............... 356/121

(Continued)

FOREIGN PATENT DOCUMENTS

JP                04198806 A  *  7/1992

(Continued)

OTHER PUBLICATIONS

Sriram et al., "Curvature and focal length measurements using compensation of a collimated beam," Optics & Laser Technology, vol. 23, Issue 4, Aug. 1991, abstract.*

*Primary Examiner*—Gregory J Toatley, Jr.
*Assistant Examiner*—Gordon J Stock, Jr.
(74) *Attorney, Agent, or Firm*—Sofer & Haroun, LLP

(57) ABSTRACT

The invention relates to a method and to apparatus for contactlessly measuring the curvature of an ophthalmic article (1) having a "front" face (1B) that presents said curvature. The method consists in: sequentially emitting at least two light beams ($L_1$, $L_2$) onto said front face, these two light beams being offset by a certain angle ($\alpha$) and converging substantially onto said front face, one of said emitted light beams ($L_1$) being substantially centered on said front face and being substantially normal to said front face; analyzing the wave fronts of the resulting reflected beams ($L'_1$, $L'_2$) in order to determine their respective focuses ($F_1$, $F_2$) therefrom; and deducing the radius of curvature of said face; said operations being performed in such a manner that said emitted beams are substantially not reflected by the rear face of said article.

4 Claims, 1 Drawing Sheet

U.S. PATENT DOCUMENTS

| | | | |
|---|---|---|---|
| 6,750,958 B1 * | 6/2004 | Fantone et al. | 356/124 |
| 6,819,413 B2 * | 11/2004 | Neal et al. | 356/123 |
| 6,972,849 B2 * | 12/2005 | Kuchel | 356/513 |
| 2002/0126293 A1 * | 9/2002 | Deck | 356/496 |
| 2003/0112426 A1 * | 6/2003 | Devie et al. | 356/124 |

FOREIGN PATENT DOCUMENTS

WO    WO 2006067050 A1 *    6/2006

* cited by examiner

METHOD AND APPARATUS FOR CONTACTLESS MEASUREMENT OF THE RADIUS OF CURVATURE OF AN OPHTHALMIC ARTICLE

RELATED APPLICATIONS

This application is a National Phase application of PCT/EP 2005/056620, filed on Dec. 8, 2005, which in turn claims the benefit of priority from French Patent Application No. 04 53086, filed on Dec. 20, 2004, the entirety of which is incorporated herein by reference

FIELD OF THE INVENTION

The invention relates to a method and to apparatus for contactless measurement of the radius of curvature of an ophthalmic article.

It relates more precisely to an ophthalmic lens. The term "lens" is used herein to mean a finished lens provided with antireflection and other types of treatment, and ready to be positioned in a frame, or a semi-finished lens, or a lens blank, i.e. that is to be subjected to at least one kind of treatment, e.g. surfacing treatment, in order to be usable. Such a semi-finished lens has a finished front face adapted to correct-eyesight, and an unfinished rear face that requires subsequent treatment.

BACKGROUND OF THE INVENTION

Methods of the optical type or of mechanical type are known for measuring radius of curvature while making contact. Given the contact they make, they have the drawback of leading to damage, essentially to scratches on the article.

It is also known to measure the radius of curvature of an article without making contact, e.g. by interferometry. Such a method is complex to implement since it requires both very precise relative positioning between the article, and the work to be carried out in monochromatic light. Furthermore, with that method, a measurement step is relatively lengthy.

OBJECTS AND SUMMARY OF THE INVENTION

An object of the invention is to provide a method and apparatus for measuring the radius of curvature of said front face that makes it easy and quick to determine said essential characteristic of the lens, e.g. enabling it to be classified as a function of said radius of curvature, and without risk of error. Furthermore, the method in accordance with the invention does not require severe relative positioning constraints for the article. In addition, the measurement is performed without making any contact that might harm the front surface of the ophthalmic article.

To achieve this, the invention proposes a method of contactlessly measuring the radius of curvature of an ophthalmic article having a front face that presents said curvature, the method being characterized in that it consists in:

sequentially emitting at least two light beams onto said front face, these two light beams being offset by a certain angle ($\alpha$) and converging substantially onto said front face, one of said emitted light beams being substantially centered on said front face and being substantially normal to said front face;

analyzing the wave fronts of the resulting reflected beams in order to determine their respective focuses therefrom; and deducing the radius of curvature of said face.

In a preferred embodiment, said article is stationary.

Preferably, the wavelength of said light beams is selected in such a manner that the beams are substantially absorbed by the material of the article.

When said article is made of organic material, said emitted light beams are preferably ultraviolet (UV) beams.

The invention also provides measurement apparatus for implementing the above-specified method, characterized in that it comprises two light sources for sending said light beams, and a wave front analyzer device for analyzing the resulting reflected beams.

Preferably, said light sources are substantially point sources.

Advantageously, said sources are stationary.

BRIEF DESCRIPTION OF THE DRAWINGS

The invention is described below in greater detail with reference to figures that merely show a preferred embodiment of the invention.

DETAILED DESCRIPTION

Figure 1:
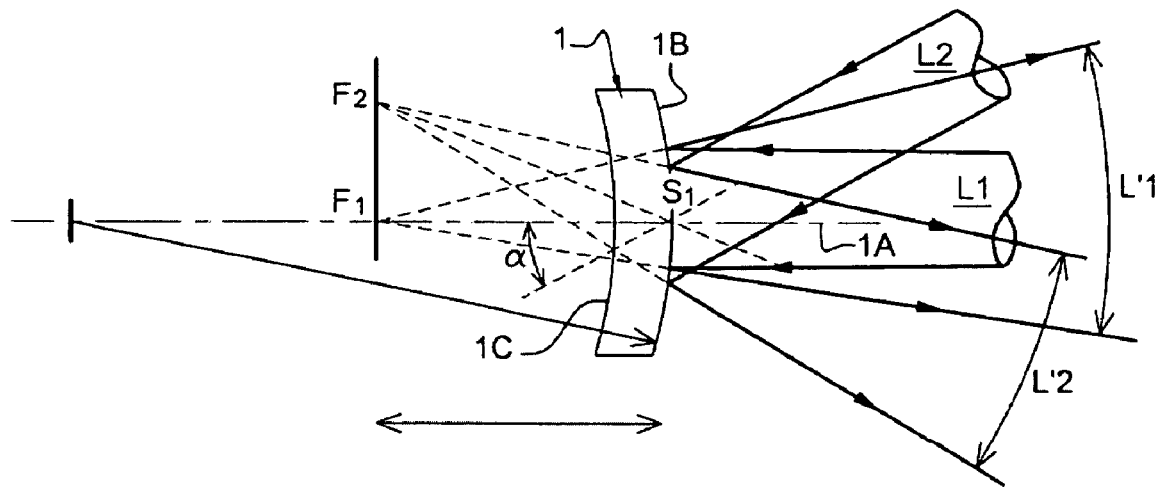
FIG. 1 is a view illustrating the method in accordance with the invention.

FIG. 1 illustrates the method of contactlessly measuring the radius of curvature of an ophthalmic article presenting a normal axis 1A, and in particular an ophthalmic lens 1 that may be spherical or aspherical and that includes a front face 1B presenting said curvature.

The method consists in:

sequentially emitting two light beams $L_1$, $L_2$ onto the front face 1B of the stationary article, these two beams being offset by a certain angle $\alpha$ and converging substantially on the face 1B, one of said emitted light beams $L_1$ being substantially centered on the front face and substantially normal thereto; and analyzing the wave front of the resulting reflected beams $L'_1$, $L'_2$ in order to determine their respective focuses $F_1$ and $F_2$.

According to an essential characteristic of the invention, these operations are performed in such a manner that the emitted beams $L_1$, $L_2$ are substantially not reflected by the rear face 1C of the lens 1.

To do this, the wavelength of the emitted light beams $L_1$, $L_2$ is preferably selected in such a manner that the beams are substantially absorbed by the material of the lens 1.

For a lens made of organic material, these emitted light beams are UV beams.

Alternatively, an absorbent mask may be placed on the rear face, said rear face may also be ground.

The wave fronts of the resulting reflected beams $L'_1$, $L'_2$ are analyzed in conventional manner to enable their respective foci $F_1$, $F_2$ to be determined. By way of example, this is done with the help of an analyzer device as described in patent document FR 2 788 597, incorporated by reference, which is based on Shack-Hartmann type analysis for calculating a parameter that is characteristic of the mean curvature of a wave front.

A method analyzing the wave fronts would be as follows. First, sequentially emit the light beams ($L_1$ and $L_2$), onto the front face, these two light beams being offset by a certain angle ($\alpha$) and converging substantially onto the front face, $L_1$ being substantially centered on the front face and being substantially normal to the front face. Then, analyze the wave fronts of the resulting reflected beams ($L'_1$ and $L'_2$) in order to determine their respective foci ($F_1$ and $F_2$) therefrom.

The radius of curvature R of the front face 1B is then deduced by the calculated formula:

$$R = \frac{2F_1 F_2}{\tan(\alpha)}$$

It should be observed that the method in accordance with the invention also makes it possible to determine the position of the front surface relative to the virtual pupil plane of the measurement apparatus. This optionally makes it possible to determine the distance between the ophthalmic article and the measurement apparatus. This other determination can be used to determine the thickness of the ophthalmic article, for example.

Figure 2:
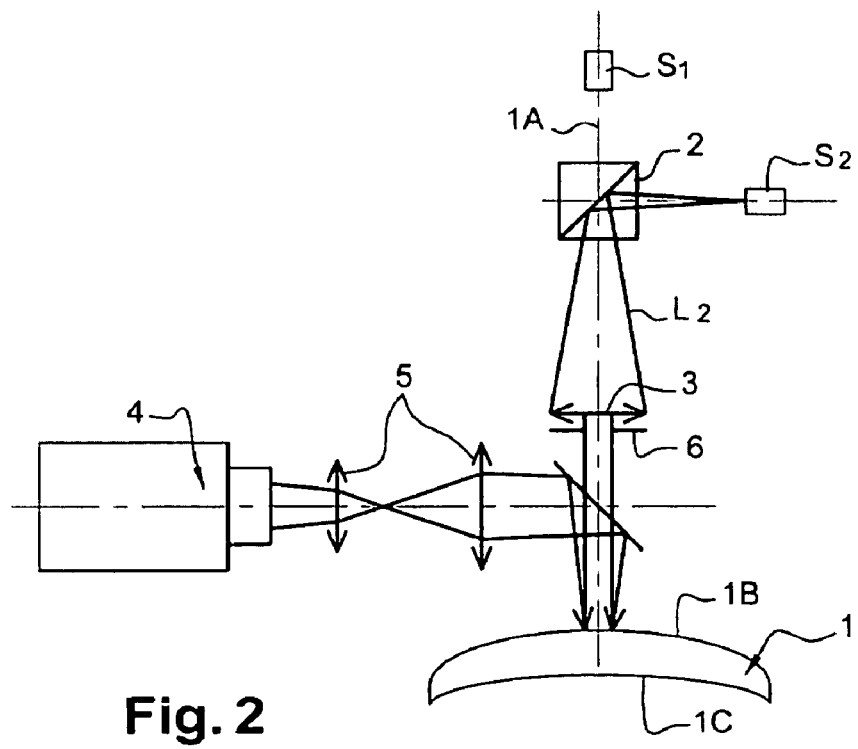
FIG. 2 is a side view of measurement apparatus in accordance with the invention.

Measurement apparatus for implementing the method is shown in FIG. 2.

The apparatus comprises two stationary light sources $S_1$, $S_2$ for emitting the light beams. A first source $S_1$ is disposed on the optical axis 1A of the lens 1 and emits a first light beam $L_1$ (not shown in the figure) parallel to said optical axis.

A second light source $S_2$ is disposed to one side of a reflector element 2 so as to emit a second light beam $L_2$ that is offset by a certain angle relative to the first beam and that converges substantially onto the front face 1B of the lens 1 relative to said first beam.

A collimator device 3, e.g. a collimator lens, is advantageously placed on the common path of these two beams, and a diaphragm 6 limits the section of these beams to a relatively small area. It is located close to the collimator device 3, downstream therefrom on the path of the light beams.

An optronic device 4 for analyzing reflected wave fronts such as the device described in patent document FR 2 788 597 is placed across these beams. The device 4 uses image-taking systems 5, including a filter, to determine the respective focuses of the two reflected beams that result from the two emitted beams $L_1$, $L_2$.

The apparatus also includes a calculation unit that deduces the radius of curvature of the front face 1B of the lens 1. This calculation unit may be connected to a radius of curvature database enabling the lens to be classified by performing a comparison.

In a preferred embodiment, the apparatus is for measuring the radius of curvature of a lens made of organic material and the light sources are UV light-emitting diodes (LEDs).

By way of an example of a practical embodiment, the diameter of the beam collimated by the collimator device 3 lies in the range 4 mm to 5 mm; the diameter of the beam analyzed by the analyzer device 4 is about 3.6 mm in a plane parallel to the virtual pupil plane of the measurement apparatus and preferably located less than 10 mm from the lens. The time required for taking a measurement can be less than 2 seconds (s).

Although described in the context of measuring the radius of curvature of the front face of a finished or semi-finished lens, the method in accordance with the invention can be used for any ophthalmic article, for example such as an ophthalmic mold, made of glass or metal, and regardless of the material of said article, i.e. whether the material is organic or inorganic, for the purpose of measuring the radius of curvature of one of its faces.

It can be used for measuring the radius of curvature of a single-vision lens, as described above, and also for a bifocal or a trifocal lens. Under such circumstances, the measurement is performed on the corresponding focusing segment or segments placed on the lens as described above.

The method in accordance with the invention can also be applied to measuring the radius of curvature of a progressive lens.

On the same principles, it can be used for measuring the radius of curvature of a convex face, as described above, or of a concave face.

The invention claimed is:

1. A method of contactlessly measuring a radius of curvature of an ophthalmic article having a front face that presents said curvature and a rear face, the method comprising the steps of:

sequentially emitting at least two light beams onto said front face, these two light beams being offset by a certain angle and converging substantially onto said front face, one of said emitted light beams being substantially centered on said front face and being substantially normal to said front face;

analyzing the wave fronts of resulting reflected beams in order to determine their respective foci therefrom; and deducing the radius of curvature of said front face; operations being performed in such a manner that said emitted beams are substantially not reflected by the rear face of said article.

2. A measurement method according to claim 1, wherein said article is stationary.

3. A measurement method according to claim 1, wherein a wavelength of said light beams is selected in such a manner that the beams are substantially absorbed by a material of the article.

4. A method according to claim 1, for an article made of organic material, wherein said emitted light beams are UV beams.

* * * * *